United States Patent [19]

Schweikert

[11] Patent Number: 4,633,761
[45] Date of Patent: Jan. 6, 1987

[54] AIR SPRING
[75] Inventor: Willi Schweikert, Heidelberg, Fed. Rep. of Germany
[73] Assignee: Firma Carl Freudenberg, Weinheim, Fed. Rep. of Germany
[21] Appl. No.: 776,813
[22] Filed: Sep. 17, 1985
[30] Foreign Application Priority Data
Sep. 21, 1984 [DE] Fed. Rep. of Germany ....... 3434658
[51] Int. Cl.$^4$ .............................................. F15B 11/10
[52] U.S. Cl. ......................................... 91/433; 91/443; 91/454; 137/116.3; 137/116.5
[58] Field of Search ......................... 91/433, 443, 454; 137/116.3, 116.5, 627.5

[56] References Cited
U.S. PATENT DOCUMENTS

| | | | |
|---|---|---|---|
| 2,940,462 | 6/1960 | Johanson | 137/116.3 |
| 2,984,251 | 5/1961 | Quinby | 137/116.5 |
| 3,298,384 | 1/1967 | Payne | 91/433 |
| 4,194,522 | 3/1980 | Lucas et al. | 137/116.5 |
| 4,195,552 | 4/1980 | Neff | 91/443 |
| 4,432,385 | 2/1984 | Legris | 91/443 |

Primary Examiner—James C. Yeung
Attorney, Agent, or Firm—Felfe & Lynch

[57] ABSTRACT

A pressure controller for an air spring having a gas-filled, variable interior space for spring action between relatively-vibrating bodies has intake and outlet valve stems for opposite valve action and an first actuating piston responsive to the gas pressure in the variable interior space for moving at least one of the valve stems. High pressure in the variable interior space opens the outlet valve to vent the variable interior space to the atmosphere and low pressure in the variable interior space opens the inlet valve to supply compressed gas to the variable interior space from a reservoir.

18 Claims, 3 Drawing Figures

AIR SPRING

BACKGROUND OF THE INVENTION

The invention relates to an air spring.

A known air spring for use between relatively-vibrating bodies has a gas-pressurized, variable interior space connected to a gas outlet valve and to a gas intake valve which, in turn, is connected to a compressed-gas reservoir. Each of the intake and outlet valves has a valve seat and a positioning element (hereafter called a stem) elastically pressed thereunto. At least one actuating piston actuates (opens and closes) not more than one of the two valves. For this, a face of the actuating piston is subjected to the gas pressure of the interior space and displaceable in a housing in the direction for actuating the valve, the seat of the other valve being formed by the housing.

For one example, German patent publication DAS No. 12 82 475 discloses a pneumatically-damped air-suspension system in which a double-acting valve connects the variable interior space of an air spring to an equalizing space. The valve is actuated by vibration-induced pressure differentials between the interior space of the air spring and the equalizing space to provide some compensation for the over- or under-pressures in the air spring producing the pressure differentials.

For another example, another air spring is described in U.S. Pat. No. 2,965,372. In it, the variable interior space for spring action between relatively-vibrating bodies is formed by one side of a double-ended piston and cylinder combination. The one side of the piston is acted on by compressed gas at a mean pressure, but when external, vibration forces change the variable interior space and, thus, its pressure, this displaces the piston and, thereby, actuates a valve which adjusts a gas pressure acting on the other, side of the piston to the gas pressure then effective on the one, first-mentioned side. This effectively-reciprocal adjustment of the gas pressures on both sides of the piston is effected by supplying gas at a pressure above the mean pressure from a surge tank or by exhausting gas to the atmosphere. However, the valve actuation is dependent on the instantaneous piston position and, thus, makes no allowance for the phase shift of the instantaneous gas pressure relative to the associated piston position which becomes significant when higher-frequency vibrations are introduced into the air spring. The valve actuation then is incorrect and results in poor isolating action.

SUMMARY OF THE INVENTION

An object of the invention is, therefore, to improve an air spring of the type described above to obtain better isolation of high-frequency vibrations than with a passive air spring and better damping of vibrations in the resonance region than with known actively-compensated air springs.

Another object of the invention is to permit the spring characteristics of an air spring to be selectively modified, for example for adapting it to predictable peculiarities resulting from its use in a motor vehicle.

To these and other ends, the air spring of the invention has only one working space which, hereinafter, will be called the interior space. When filled with gas at a mean pressure, it is variable with relatively-vibratible bodies connected to the air spring, for example, the frame and body of a motor vehicle and supporting steering control arms of a wheel therefor, for spring action therebetween. The gas-filled, variable interior space of the air spring can, therefore, be simple in construction, for example, a hollow rubber body. Its internal pressure is, however, selectively variable as a function of the vibrations introduced. To this end, a pressure controller selectively connects the interior space of the air spring to a compressed-gas reservoir or a vent to atmosphere.

An important feature of the pressure controller is that the actual pressure in the interior space of the air spring serves as a control pressure for actuating intake and outlet valves which selectively connect the interior space of the air spring to the compressed-gas reservoir and vent to atmosphere. When the pressure in the interior space rises, the outlet valve is opened to exhaust gas therefrom to the atmosphere and, thereby, prevent a further increase of the pressure and, when the pressure drops, the intake valve is opened to permit compressed gas from the reservoir to flow into the interior space and, thereby, prevent a further pressure drop. This results in excellent compensation of the vibrations introduced into the air spring by the relatively-vibratible bodies. To secure the resulting, excellent vibration compensation further, the responsiveness and dynamic behavior of the intake and outlet valves are, preferably, also controlled.

BRIEF DESCRIPTION OF THE DRAWINGS

Preferred characteristics and embodiments which illustrate but do not limit the invention will now be described with reference to drawings in which.

DESCRIPTION OF CHARACTERISTICS AND PREFERRED EMBODIMENTS

Figure 1:
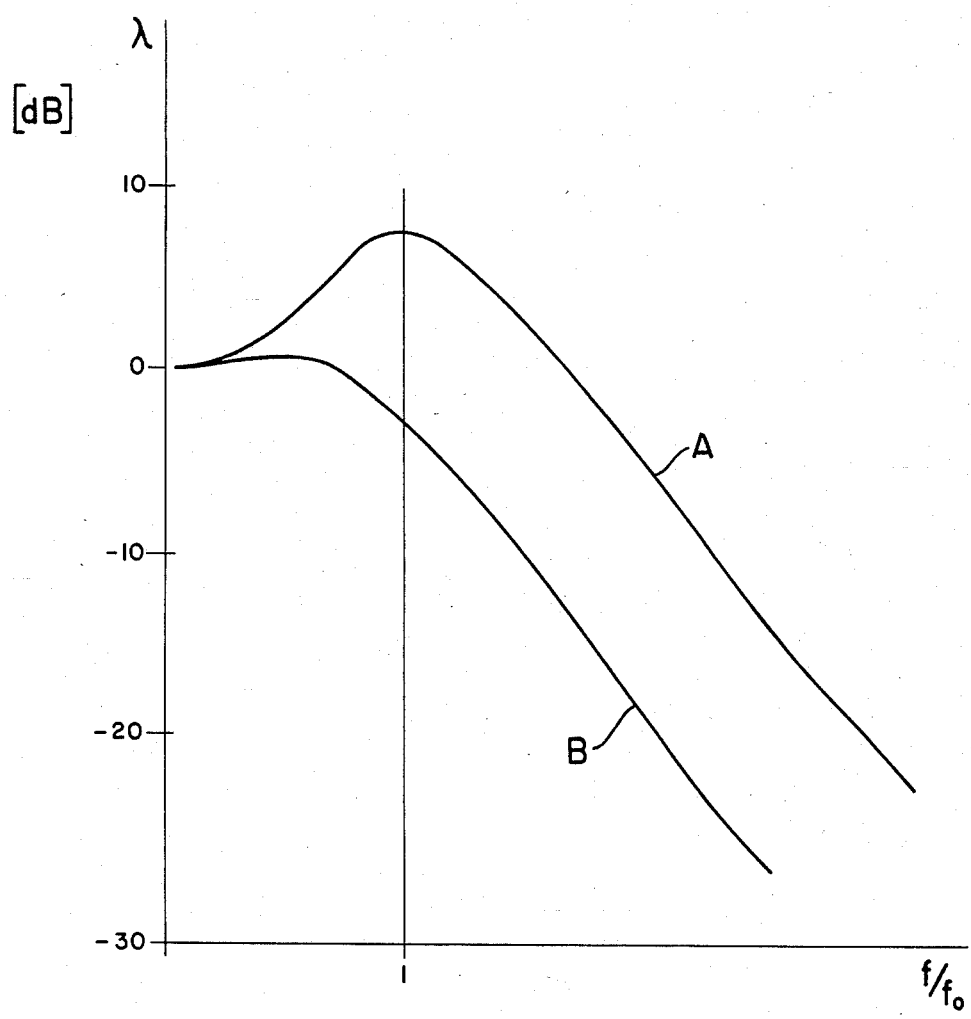
FIG. 1 is a comparative nomograph of the transfer functions of air springs according to German patent publication DAS No. 12 82 475 and the invention.

Comparison of the transfer function A of the previously-described air spring of published German patent application DAS No. 12 82 475, reviewed earlier, with that, B, a design according to the invention in FIG. 1 shows that the prior-art device amplifies the vibration-induced spring excursion in the region of resonance but that this is not the case with the device of the invention. Moreover, the latter provides better isolation of high-frequency vibrations, as shown to the left in the Fig., when a pressure controller of sufficiently high responsiveness is used. "Sufficiently high" in this context means that the natural frequency of the valve stems in the pressure controller is higher than the frequency of operation-induced vibrations in the air spring. This requirement is readily met in practice by the use of pressure controllers of relatively-small size, for example, which is also consistent with the trend toward weight reduction. With the air spring of the invention, valve-actuating, compensating pressure variations in the interior space thus occur also in the high-frequency region.

To secure these advantageous characteristics in an air spring according to the invention, the intake and outlet valves are not only arranged and designed in the manner described but also, preferably, designed with respect to their responsiveness and dynamic behavior.

Figure 2:
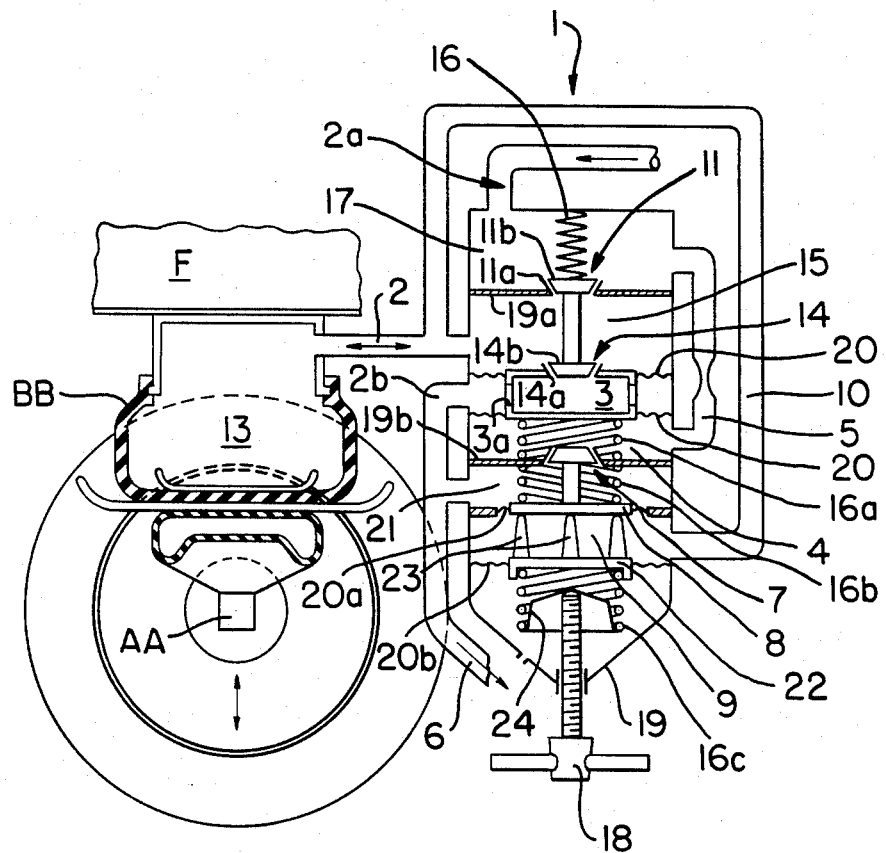
FIG. 2 is a schematic elevation, partly enlarged, of one preferred embodiment.

The preferred embodiment of an air spring shown in FIG. 2 has a gas-filled, rubber bellows BB which supports the frame and body F of a motor vehicle on an axle AA, in this case, via a steering control arm of a wheel of the vehicle. The bellows has a variable interior space 13 which is connected to a pressure controller, shown enlarged at 1, through a line 2.

The line 2 is connected to an antechamber 15 of the pressure controller. An intake valve at 11 in the pressure controller valve-connects the antechamber 15 to a surge chamber 17. The surge chamber 17 is connected by a line at 2a to a compressed-gas reservoir (not shown) so that, when the intake valve at 11 is open, compressed gas is supplied to the variable interior space 13 of the bellows BB through the line 2.

For this, the intake valve at 11 has a seat 11a in a fixed wall 19a of a housing 19 for the pressure controller and a cooperative stem 11b which is beveled outwardly from the antechamber 15 toward the surge chamber 17. A spring 16 across the surge chamber 17 engages the intake valve stem 1b to urge it into its seat 1a so that the intake valve is normally closed.

The side of the antechamber 15 opposite the wall 19a with the intake valve at 11 is bounded by one side of a hollow, first actuating piston 3. The hollow piston is supported circumferentially from the housing 19 by a pair of gas-tight, flexible diaphragms 20 spaced from each other on opposite sides of at least one opening 3a from the hollow piston and a pipe 2b from the housing to a vent at 6. The side of the hollow piston 3 which bounds the antechamber 15 forms the seat 14a for the stem 14b of an outlet valve at 14. As a result, opening the outlet valve connects the interior space 13 of the bellows to the vent 6 through lines 2, 2b. The stem 14b of the outlet valve is beveled outwardly toward the antechamber 15, i.e. beveled the same as the intake valve stem 11b, and rigidly connected to the stem 11b of the intake valve at 11. As a result, opening the intake and outlet valves is controlled by the hollow piston 3 and has the same opening direction.

The side of the hollow piston 3 and diaphragms opposite that bounding the antechamber 15 bounds one side of a first control chamber 4. The first control chamber communicates with the surge chamber 17 through a throttled supply line 5 and is bounded on the side opposite the piston 3 by one side of a fixed, partition portion 19b of the housing 19. A compression spring 16a is supported on the housing partition portion 19b and engages the hollow piston 3 to push its outlet valve seat 14a into the outlet valve stem 14b so that, in the rest position of the controller, the outlet valve is closed and the connected intake valve not opened.

The seat of an auxiliary valve at 7 is disposed in the partition portion 19b of the housing. It connects the first control chamber 4 with a vent chamber 21 which is connected by the pipe 2b to the vent 6 and receives a stem of the auxiliary valve 7 which is beveled outwardly toward the vent chamber. The stem of the auxiliary valve at 7 is rigidly secured to an actuating piston 8 which is movable in the direction for actuating the auxiliary valve and sealed against the housing 19 by an annular diaphragm 20a.

The second actuating piston 8 and diaphragm 20a bound one side of a second control chamber 9. A third actuating piston 22 and annular diaphragm 20b bound the opposite side of the second control chamber 9 in the housing 19. The two annular diaphragms 20a, 20b differ from each other with respect to the area subjected to the pressure thereacross, the area of diaphragm 20b being larger. Between the actuating pistongs and diaphragms, the second control chamber 9 communicates with the interior space 13 of the bellows through an equalizing line 10 which connects to the line 2.

A spring 16b projects from the housing partition portion 19b which bounds one side of the vent chamber 21 and has the seat for the auxiliary valve at 7 to the side of the second actuating piston 8 which bounds the opposite side of vent chamber and is connected to the stem of the auxiliary valve at 7 for actuating it. The opposite side of the second actuating piston 8 is engaged by rigid projections from the side of the third actuating piston 22 which bounds the second control chamber 9. The opposite side of the third actuating piston is engaged by a spring 16c projecting from a set screw support 18, the set screw thereof being threaded through the housing 19 for adjusting the force of the spring 16c on the third actuating piston 22 for closing the auxiliary valve 7 via the second actuating piston 8 engaged by the projections of the third actuating piston 22 and connected to the stem of the auxiliary valve 7 in relation to a pressure in the pressure controller.

The principle of operation of the embodiment of FIG. 2 is, therefore, as follows:

With the rest of the system completely exhausted, gas from the compressed-gas reservoir via line 2a provides pressure to the surge chamber 17. The intake valve 11 is then closed, however, by spring 16, and the gas flows, therefore, only through the throttled supply line 5 to build up the pressure in the first control chamber 4 gradually. The gradually-rising pressure there eventually moves the hollow, first actuating piston 3 upwardly. On its face rests the stem of the outlet valve at 14 which is rigidly connected to the stem of the intake valve at 11. The latter is, therefore, opened and the gas flows from the surge chamber into the interior space 13 of the bellows through the intake valve at 11, antechamber 15 and line 2.

The resulting pressure rise in the interior space 13 of the bellows also occurs in the connected antechamber 15 of the pressure controller at 1. This pressure acts on the first actuating piston 3 to return it to its original position. The stems 11b,14b of the intake and outlet valves follow this movement under spring 16 to cut off the supply of gas to the interior space 13 when the intake valve thus closes.

If low-frequency vibrations are then introduced into the air spring from the wheel axle as the vehicle passes over undulating terrain, for example, corresponding, low-frequency pressure variations are introduced into the interior space 13 of the bellows. These pressure variations are transmitted through the line 2 to the antechamber 15 and thus act with varying magnitude on the first actuating piston 3. When, on the one hand, the pressure in the interior space drops the first actuating piston 3 is raised by the then-higher pressure in the first control chamber 4, thus causing the intake valve at 11 to open, as before. More compressed air is thus able to flow into the interior space 13 of the air spring to provide compensation for the downward wheel motion producing the pressure drop. When, on the other hand, the pressure rises, the first actuating piston 3 is moved downward against the then-lower pressure in the first control chamber 4. This causes stem 14b of the outlet valve to lift off its seat 14a in the hollow, first actuating piston 3 because connected stem 11b of the intake valve is held in its seat in the fixed housing partition portion 19a. Excess compressed gas is thus able to pass from the interior space 13 of the air spring into the hollow piston 3 and line 2b to the vent 6 and, thus, escape to provide compensation for the upward wheel motion producing the pressure increase.

In both cases, a pressure drop or rise resulting in the first actuating piston being moved upward or downward, the resulting opening of the intake or outlet valves continues until the pressure in the antechamber 15 and first control chamber 4 returns to equilibrium with the forces of springs 16, 16a. This requires the time delay of throttled line 5. As a result, the indicated low frequency vibrations are those with a longer period than the delay of throttled line 5, in which case both the described compensations occur within the low frequency of the vibrations with the results indicated to the left in FIG. 1, as opposed to high frequency vibrations similarly defined, in which case only the valve openings so occur to the dynamic limits of the system with the results indicated to the right in FIG. 1.

The set screw 18 allows the mean pressure prevailing in the interior space 13 to be changed as desired. This is useful for the suspension of a motor vehicle, as illustrated, for example, to maintain a constant height above ground when the vehicle is unevenly loaded. The action may be described as follows:

Turning the set screw 18 in the housing 19 moves the spring 16c and, thus, its force on the third actuating piston 22 parallel to the direction of motion of the stem of the auxiliary valve 7.

The third actuating piston 22 is sealed against the housing 19 by the annular diaphragm 20b and carries the projections 23 which bridge the second control chamber 9 and, at normal pressure, abut on the back of the second actuating piston 8 to press the auxiliary valve stem into its seat. The stem of the auxiliary valve 7 is, however, even then slightly spaced from its seat so that compressed gas is continuously fed to the first control chamber 4 through the supply line 5 for escape through the auxiliary valve 7, vent chamber 21 and line 2b to vent 6. Because of the restriction in the supply line 5, the resulting gas loss is very small and of no economic significance. However, decreasing these flow rates will reduce the speed of pressure-controller response, and this imposes a limit on the flow rates.

When the pressure in the interior space 13 of the air spring rises, the pressure also rises, not only in the antechamber 15, but also in the second control chamber 9 because of the equalizing line 10 connected thereto. The force of the compression spring 16c disposed between the set screw 18 and the third actuating piston 22 is more offset thereby than spring 16b on the second actuating piston 8 because of the difference in area between diaphragms 20a,20b, with the result that the stem of the auxiliary valve separates still farther from its seat. Even more compressed gas is therefore able to escape from the first control chamber 4 through the auxiliary valve 7, thus causing a still greater pressure drop in the first control chamber 4. The first actuating piston 3 is, therefore, displaced in the direction of the first control chamber 4 to lift the stem which closes the outlet valve 14 off its seat via the connected inlet valve stem, thus permitting excess compressed gas to escape, as is desired in this case, until the mean pressure set by the set screw 18 has been reached.

A pressure drop in the interior space 13 will set off the reverse sequence of events. In this case, the force of the compression spring 16c between the set screw 18 and the third actuating piston 22 is less compensated by the pressure and, therefore, presses the positioning element of the auxiliary valve 7 onto its seat. This reduces escape of the compressed gas which continuously flows into the first control chamber 4 through the supply line 5 and, as it accumulates in the first control chamber, its pressure moves the first actuating piston 3 and thus the stem of the intake valve 11 upward. More compressed gas is thus able to flow from the compressed-gas reservoir into the interior space 13 of the air spring until the pressure level originally set by the set screw 18 has again been reached.

The mean pressure in the interior space 13 of the air spring can thus be readily changed by the set screw 18. When the air spring of the invention is used as a vehicle spring, uneven loading can thus be compensated so that the original height above ground is maintained. This is very important from the standpoint of driving safety. Automatic adjustment of course is also possible. A servomechanism of conventional design is then employed in place of the set screw.

Figure 3:
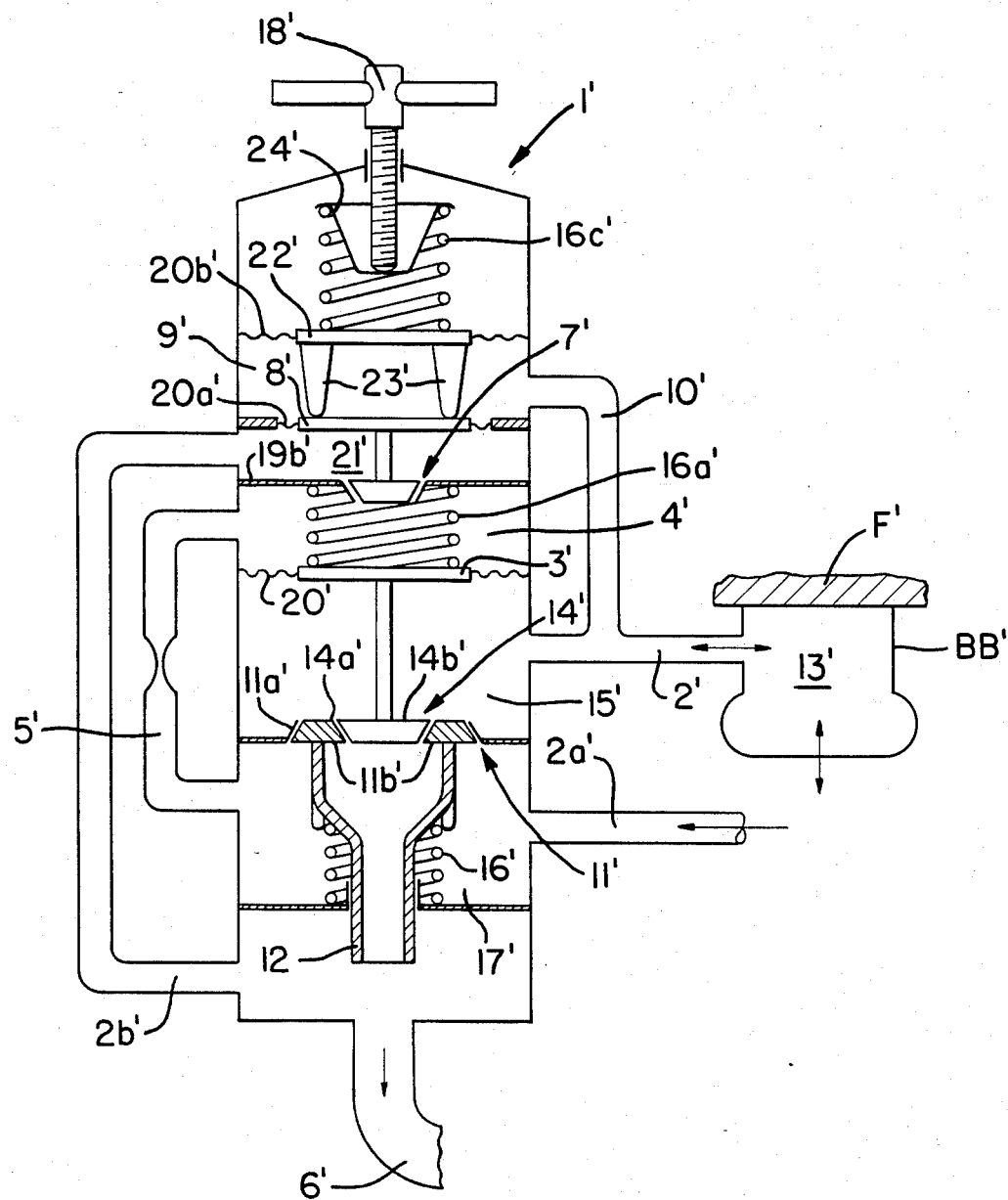
FIG. 3 is a schematic elevation, partly enlarged, of another preferred embodiment.

In the controller shown in FIG. 3, the intake valve 11' and the outlet valve 14' are nested and have opposite opening directions. This results in some simplification of construction. However, it makes it necessary for the stem of the intake valve to be a hollow slider 12 which slidably but sealingly penetrates the wall of the housing 19' axially to vent 6'. In the embodiment illustrated, the slider has rotational symmetry. It is stem 11b' urged by a compression spring 16' to bear on its seat 11a' to close it when the controller is not operating.

The seat 14a' of the outlet valve is radially within the stem 11b' of the intake valve. On it rests the associated outlet valve stem 14b' which, in this embodiment, is rigidly attached to one side of first actuating piston 3' which is not hollow, the hollow slider 12 providing the passage to vent 6' in this embodiment. The other side of the first actuating piston 3' bounds one side of the first control chamber 4' which is connected to the surge chamber 17' through a throttled supply line 5, as in FIG. 2. The other side of the first control chamber 4' is closed by a housing wall portion 19b' extending perpendicularly to the direction of motion of the stems of the intake and outlet valves, said wall portion 19b' providing the seat of the auxiliary valve 7' and supporting the compression spring 16a' which bears on the other side of the first actuating piston 3', also as in FIG. 2.

The auxiliary valve 7' is, as in FIG. 2, a leaky bevel-plug valve with a stem rigidly attached to the second actuating piston 8' which, like the first actuation piston 3, is sealed against the housing by a respective annular diaphragm 20a',20'. Also, the vent chamber 21' enclosed by the wall portion 19b' and the second actuating piston 8' communicates with the vent 6 to atmosphere through a vent line 2b'.

As in FIG. 2, too, the second actuating piston 8' bounds the second control chamber 9' on one side and the third actuating piston 22' bounds it on the other side together with another annular diaphragm 20b' to the housing 19' in which the pressure controller 1' is accommodated. The second actuating piston 8' also has projections 23 which bridge the second control chamber to bear on one side of the second actuating piston 8' when the controller is not in operation. The other side of the third actuating piston 22' is loaded by compression spring 16c', the pressure of which can be varied by turning a set screw 18' threaded from the housing 19' to a spring retainer 24. The annular diaphragm 20b' of third actuating piston 22' again has a larger pressure area in relation to the second control chamber 9' than that, 20a', of the second actuating piston 8, too. The second control chamber 9' again communicates with the interior space 13 of the air spring through an equalizing line 10' too. The pressures in the second control chamber 9' and in the antechamber 15 are, therefore, equal at all times to the pressure in the interior space 13' of the bellows BB'.

The structure of FIG. 3 being similar to that of FIG. 2, so is the principle of operation, as follows:

An increase in the pressure in the interior space 13' of the air spring produces a pressure rise in the antechamber 15' and in the second control chamber 9'. The force of the compression spring 16c' which loads the third actuating piston 22' is thus partly offset and the auxiliary valve 7' opened further.

The pressure level in the first control chamber 4' is thus lowered still further to result in upward movement of the first actuating piston 3' and, hence, opening of the outlet valve 14'. The excess gas producing higher pressure in the interior space 13' is thus able to escape.

Conversely, a pressure drop in the interior space 13 of the air spring produces a pressure drop of the same magnitude in the antechamber 15 and second control chamber 9'. The force of the compression spring 16c' determined by the set screw 18 on the third actuating piston 22', then closes the auxiliary valve 7' as much as it closes. The result is an increase in the pressure in the first control chamber 4'. It produces downward movement of the first actuating piston 3', including the slider 12 and, consequently, opening of the intake valve 11'. More compressed gas is thus able to flow from the compressed-gas reservoir into the interior space 13' of the air spring until the pressure level originally set by the set screw 18' has again been reached.

It will be appreciated that the instant specification and claims are set forth by way of illustration and not of limitation, and that various changes and modifications may be made without departing from the spirit and scope of the present invention.

What is claimed is:

1. A pressure controller for an air spring having an interior space which is variable in response to relatively-vibratable bodies between which the air spring is used for spring action therebetween when filled with a gas, the pressure controller comprising:
   a housing;
   a first actuating piston movably sealed in the housing and having a face for bounding one side of an antechamber in the housing, the face of the first actuating piston having an outlet valve seat and vent means for venting gas to the atmosphere from the outlet valve seat through the first actuating piston;
   first gas line means for gas connecting the antechamber and the outlet valve seat to the gas in the variable interior space of the air spring and, through an intake valve seat in the housing, for gas connecting the variable interior space of the air spring to a compressed-gas reservoir;
   a first control chamber in the housing on the opposite side of the first actuating piston from the antechamber;
   a first compression spring across the first control chamber for spring force on the face of the first actuating piston opposite that bounding the antechamber and having the outlet valve seat, whereby to move the first actuating piston in response to the relative spring force and gas pressure in the antechamber;
   an outlet valve stem and an intake valve stem, the outlet valve stem being seatable in the outlet valve seat on the first actuating piston for outlet valve action on the vent means therethrough in response to the movement of the first actuating piston, and the intake valve stem being seatable in the intake valve seat for intake valve action on the gas line means for connecting the variable interior space of the air spring to the compressed-gas reservoir, the intake and outlet valve stems being movable in the housing by the first actuating piston and interconnected for opposite valve actions thereupon;
   a second compression spring in the housing operative on the interconnected intake and outlet valve stems oppositely to the first compression spring on the first actuating piston;
   second gas line means for gas connecting the first control chamber to the first gas line means for connecting the antechamber to the variable interior space;
   a vent chamber in the housing having a second actuating piston movably sealed in the housing and bounding one side thereof;
   an auxiliary valve connecting the control and vent chambers and having a stem for valve actuation thereof connected to the second actuating piston;
   a second control chamber in the housing bounded on one side by the side of the second actuating piston opposite that bounding the vent chamber and having a third actuating piston bounding the side of the second control chamber opposite that bounded by the second actuating piston;
   equalizing gas line means gas connecting the second control chamber to the first gas line means for connecting the antechamber to the variable interior space;
   at least one projection across the second control chamber between the second and third actuating pistons.

2. The pressure controller of claim 1, and further comprising at least one annular diaphragm for movably sealing at least one of the first, second, and third actuating pistons in the housing.

3. The pressure controller of claim 1, and further comprising a throttle in the second gas line means.

4. The pressure controller of claim 2, and further comprising a throttle in the second gas line means.

5. The pressure controller of claim 1, and further comprising force means in the housing for applying a variable force to urge the third actuating piston toward the second actuating piston.

6. The pressure controller of claim 2, and further comprising force means in the housing for applying a variable force to urge the third actuating piston toward the second actuating piston.

7. The pressure controller of claim 3, and further comprising force means in the housing for applying a variable force to urge the third actuating piston toward the second actuating piston.

8. The pressure controller of claim 4, and further comprising force means in the housing for applying a variable force to urge the third actuating piston toward the second actuating piston.

9. The pressure controller of claim 8, wherein the force means is a spring in the housing and a set screw engaging the spring and threadedly projecting through the housing.

10. A pressure controller for an air spring having an interior space which is variable in response to relatively-vibratible bodies between which the air spring is used for spring action therebetween when filled with a gas, the pressure controller comprising:

a housing;

a first actuating piston movably sealed in the housing and having a face for bounding one side of an antechamber in the housing, the face of the first actuating piston having an outlet valve stem projecting across the antechamber;

first gas line means for gas connecting the antechamber to the gas in the variable interior space of the air spring and, through an intake valve seat in the housing, for gas connecting the variable interior space of the air spring to a compressed-gas reservoir;

a first control chamber in the housing on the opposite side of the first actuating piston from the antechamber;

a first compression spring across the first control chamber for spring force on the face of the first actuating piston opposite that bounding the antechamber, whereby to move the first actuating piston in response to the relative spring force and gas pressure in the antechamber;

vent means in the housing for venting gas to the atmosphere;

an intake valve stem comprising a hollow slider having a face for seating in the intake valve seat and forming annularly therein a seat for the outlet valve stem, the hollow slider sealingly and movably extending through a portion of the housing to the vent means;

a second compression spring in the housing operative on the slider oppositely to the first compression spring on the first actuating piston for urging the face of the intake valve stem into the intake valve seat;

second gas line means for gas connecting the first control chamber to the first gas line means for connecting the antechamber to the variable interior space;

a vent chamber in the housing, having a second actuating piston movably sealed in the housing and bounding one side thereof, and connected to the vent means;

an auxiliary valve connecting the control and vent chambers and having a stem for valve actuation thereof connected to the second actuating piston;

a second control chamber in the housing bounded on one side by the side of the second actuating piston opposite that bounding the vent chamber and having a third actuating piston bounding the side of the second control chamber opposite that bounded by the second actuating piston;

equalizing gas line means gas connecting the second control chamber to the first gas line means for connecting the antechamber to the variable interior space;

at least one projection across the second control chamber between the second and third actuating pistons.

11. The pressure controller of claim 10, and further comprising at least one annular diaphragm for movably sealing at least one of the first, second, and third actuating pistons in the housing.

12. The pressure controller of claim 10, and further comprising a throttle in the second gas line means.

13. The pressure controller of claim 11, and further comprising a throttle in the second gas line means.

14. The pressure controller of claim 10, and further comprising force means in the housing for applying a variable force to urge the third actuating piston toward the second actuating piston.

15. The pressure controller of claim 11, and further comprising force means in the housing for applying a variable force to urge the third actuating piston toward the second actuating piston.

16. The pressure controller of claim 12, and further comprising force means in the housing for applying a variable force to urge the third actuating piston toward the second actuating piston.

17. The pressure controller of claim 13, and further comprising force means in the housing for applying a variable force to urge the third actuating piston toward the second actuating piston.

18. The pressure controller of claim 17, wherein the force means is a spring in the housing and a set screw engaging the spring and threadedly projecting through the housing.

* * * * *